(12) United States Patent
Nickel (10) Patent No.: US 9,900,248 B2
(45) Date of Patent: Feb. 20, 2018

(54) SUBSCRIBER STATION FOR A BUS SYSTEM AND METHOD FOR BROADBAND CAN COMMUNICATION

(71) Applicant: Robert Bosch GmbH, Stuttgart (DE)

(72) Inventor: Patrick Nickel, Birstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 216 days.

(21) Appl. No.: 14/816,223

(22) Filed: Aug. 3, 2015

(65) Prior Publication Data

US 2016/0043947 A1 Feb. 11, 2016

(30) Foreign Application Priority Data

Aug. 5, 2014 (DE) .......................... 10 2014 215 468

(51) Int. Cl.
*H04J 3/24* (2006.01)
*H04L 12/741* (2013.01)
(Continued)

(52) U.S. Cl.
CPC ........ *H04L 45/74* (2013.01); *H04L 12/40084* (2013.01); *H04L 12/413* (2013.01); *H04L 29/12254* (2013.01); *H04L 69/22* (2013.01); *H04L 61/2038* (2013.01); *H04L 61/6004* (2013.01); *H04L 61/6027* (2013.01); *H04L 61/6095* (2013.01)

(58) Field of Classification Search
USPC .......................... 370/241, 252, 473, 474, 537
See application file for complete search history.

(56) References Cited

U.S. PATENT DOCUMENTS 4,654,807 A * 3/1987 Bremer .................. H04L 1/205
375/228
6,631,431 B1 * 10/2003 Silvkoff ................ G06F 13/385
710/100
(Continued)

FOREIGN PATENT DOCUMENTS

DE 102009026961 5/2013

OTHER PUBLICATIONS

"CAN with Flexible Data-Rate Specification, Version 1.0" (released Apr. 17th, 2012) http://www.bosch-semiconductors.de/media/pdf_1/canliteratur/can_fd_spec.pdf.
ISO 11898-1:2003; Road vehicles—Controller area network (CAN)—Part 1: Data link layer and physical signaling, Document published on: Dec. 1, 2003.

*Primary Examiner* — Kwang B Yao
*Assistant Examiner* — Nguyen Ngo
(74) *Attorney, Agent, or Firm* — Norton Rose Fulbright US LLP; Gerard Messina (57) ABSTRACT

A user station for a bus system implementing broadband CAN communication includes: a communication control device for creating or reading at least one message for/from at least one further user station of the bus system, in which exclusive, collision-free access of a user station to a bus of the bus system is ensured at least intermittently; and a data interleaving device for interleaving data packets of at least two messages into a single message, so that the data packets are situated in one data segment of the single message. The single message has a shared outer frame header for the data packets in front of the data segment and a shared outer frame end for the data packets after the data segment.

8 Claims, 3 Drawing Sheets

(51) Int. Cl.
　　　*H04L 12/413*　　(2006.01)
　　　*H04L 29/12*　　(2006.01)
　　　*H04L 29/06*　　(2006.01)
　　　*H04L 12/40*　　(2006.01)

(56) References Cited

U.S. PATENT DOCUMENTS

| | | | |
|---|---|---|---|
| 2003/0070019 A1* | 4/2003 | Dalakuras | H04L 12/40156 710/110 |
| 2007/0033312 A1* | 2/2007 | Flandre | H04L 12/403 710/110 |
| 2008/0192659 A1* | 8/2008 | Santavicca | B60C 23/0462 370/280 |
| 2010/0296492 A1* | 11/2010 | Jain | H04L 1/1854 370/336 |
| 2012/0030490 A1* | 2/2012 | Makino | H04L 12/12 713/323 |
| 2012/0137034 A1* | 5/2012 | Kaneko | G06F 13/376 710/110 |
| 2014/0328357 A1* | 11/2014 | Fredriksson | H04J 3/0614 370/520 |
| 2015/0071115 A1* | 3/2015 | Neff | H04L 12/40 370/254 |
| 2015/0237174 A1* | 8/2015 | Brochi | H04L 12/6418 370/474 |
| 2016/0003035 A1* | 1/2016 | Logan | E21B 47/12 340/854.6 |

* cited by examiner

| ID10 | ID9 | ID8 | ID7 | ID6 | ID5 | ID4 | ID3 | ID2 | ID1 | ID0 |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 1 |
| 0 | 0 | 0 | 0 | 0 | 0 | 0 | 0 | 0 | 1 | 0 |
| 0 | 0 | 0 | 0 | 0 | 0 | 0 | 0 | 0 | 1 | 1 |
| 0 | 0 | 0 | 0 | 0 | 0 | 0 | 0 | 1 | 0 | 0 |
| 0 | 0 | 0 | 0 | 0 | 0 | 0 | 0 | 1 | 0 | 1 |
| 0 | 0 | 0 | 0 | 0 | 0 | 0 | 0 | 1 | 1 | 0 |
| 0 | 0 | 0 | 0 | 0 | 0 | 0 | 0 | 1 | 1 | 1 |
| 0 | 0 | 0 | 0 | 0 | 0 | 0 | 1 | 0 | 0 | 0 |
| 0 | 0 | 0 | 0 | 0 | 0 | 0 | 1 | 0 | 0 | 1 |
| 0 | 0 | 0 | 0 | 0 | 0 | 0 | 1 | 0 | 1 | 0 |
| 0 | 0 | 0 | 0 | 0 | 0 | 0 | 1 | 0 | 1 | 1 |
| 0 | 0 | 0 | 0 | 0 | 0 | 0 | 1 | 1 | 0 | 0 |
| 0 | 0 | 0 | 0 | 0 | 0 | 0 | 1 | 1 | 0 | 1 |
| 0 | 0 | 0 | 0 | 0 | 0 | 0 | 1 | 1 | 1 | 0 |
| 0 | 0 | 0 | 0 | 0 | 0 | 0 | 1 | 1 | 1 | 1 |
| 0 | 0 | 0 | 0 | 0 | 0 | 1 | 0 | 0 | 0 | 0 |
| 0 | 0 | 0 | 0 | 0 | 0 | 1 | 0 | 0 | 0 | 1 |
| 0 | 0 | 0 | 0 | 0 | 0 | 1 | 0 | 0 | 1 | 0 |
| 0 | 0 | 0 | 0 | 0 | 0 | 1 | 0 | 0 | 1 | 1 |
| 0 | 0 | 0 | 0 | 0 | 0 | 1 | 0 | 1 | 0 | 0 |
| 0 | 0 | 0 | 0 | 0 | 0 | 1 | 0 | 1 | 0 | 1 |
| 0 | 0 | 0 | 0 | 0 | 0 | 1 | 0 | 1 | 1 | 0 |
| 0 | 0 | 0 | 0 | 0 | 0 | 1 | 0 | 1 | 1 | 1 |
| 0 | 0 | 0 | 0 | 0 | 0 | 1 | 1 | 0 | 0 | 0 |
| 0 | 0 | 0 | 0 | 0 | 0 | 1 | 1 | 0 | 0 | 1 |
| 0 | 0 | 0 | 0 | 0 | 0 | 1 | 1 | 0 | 1 | 0 |
| 0 | 0 | 0 | 0 | 0 | 0 | 1 | 1 | 0 | 1 | 1 |
| 0 | 0 | 0 | 0 | 0 | 0 | 1 | 1 | 1 | 0 | 0 |
| 0 | 0 | 0 | 0 | 0 | 0 | 1 | 1 | 1 | 0 | 1 |
| 0 | 0 | 0 | 0 | 0 | 0 | 1 | 1 | 1 | 1 | 0 |
| 0 | 0 | 0 | 0 | 0 | 0 | 1 | 1 | 1 | 1 | 1 |
| 0 | 0 | 0 | 0 | 0 | 1 | 0 | 0 | 0 | 0 | 0 |
| 0 | 0 | 0 | 0 | 0 | 1 | 0 | 0 | 0 | 0 | 1 |
| 0 | 0 | 0 | 0 | 0 | 1 | 0 | 0 | 0 | 1 | 0 |
| 0 | 0 | 0 | 0 | 0 | 1 | 0 | 0 | 0 | 1 | 1 |
| 0 | 0 | 0 | 0 | 0 | 1 | 0 | 0 | 1 | 0 | 0 |
| 0 | 0 | 0 | 0 | 0 | 1 | 0 | 0 | 1 | 0 | 1 |
| ... | | | | | | | | | | |

Rows with ID2=1, ID1,ID0 varying (indices 5–8) are bracketed as G1. Rows with ID4=1, ID3=0 (indices 17–24) are bracketed as G2.

Fig. 7

SUBSCRIBER STATION FOR A BUS SYSTEM AND METHOD FOR BROADBAND CAN COMMUNICATION

BACKGROUND OF THE INVENTION

1. Field of the Invention

The present invention relates to a user station for a bus system and to a method for broadband CAN communication, in which communication in a CAN bus system is possible for higher speeds beyond CAN-FD and in which an interleaving of short data packets is used to achieve an efficient transmission when using a high-rate data segment.

2. Description of the Related Art

The CAN bus system has become widely accepted for the communication between sensors and control units. It is used in automobiles, for example. In the CAN bus system, messages are transmitted with the aid of the CAN protocol as it is described in the CAN specification in ISO 11898. In particular automobile bus systems are continuously developing toward higher bandwidths, lower latency periods, and stricter real-time capability. Most recently, technologies have also been proposed in this regard, such as CAN-FD, in which messages are transmitted, and the like, in accordance with the specification "CAN with Flexible Data-Rate, Specification Version 1.0" (source http://www.semiconductors-.bosch.de). Such technologies increase the maximally possible data rate through the use of higher clocking in the area of the data fields above a value of 1 Mbit/s.

In addition to primarily functional supplements, such as TTCAN, the extension of the CAN standard most recently was extended with CAN-FD in particular with respect to the possible (higher) data rate and the usable data packet size, the original CAN properties having been maintained, in particular in the form of the arbitration. Moreover the signal representation in the data portion was essentially changed by a higher switching frequency of the signal states (high/low).

Published German patent application document DE 10 2009 026 961 A1 relates to a method for transmitting data between user stations of a bus system. An extension of the existing CAN signal and of the associated communication device with respect to the use of high-frequency signals is described here, which is impressed onto the bus line in any arbitrary form, for example simultaneously or embedded, in relation to a CAN data stream. In particular a coordination of the signal, be it a synchronization signal or a trigger signal, with the CAN signal is proposed.

In a further approach, the applicant deliberated options for refining the CAN bus toward higher data rates; however, essential application features should be consistent with existing CAN principles. According to the extended specification for coexistence, compatibility with existing CAN users, which are also referred to as CAN nodes, and a migration path of the CAN system should be achieved. According to one option developed by the applicant, the structures of the CAN bus signal are thus maintained, in particular in the header and at the end of a CAN frame, and supplemented with a more complex transmission form in the middle segment of the CAN frame to obtain a high net data rate. The more complex transmission form in the middle segment is achieved by using high order modulation for a higher data rate in the CAN data segment. In particular, a higher number of payload data in the data segment at the same temporal frame length makes a very high net data rate possible. Due to the possible reflections on the bus line, methods for signal equalization are provided in the receiver and taken into consideration in the design of the frame format.

However, it remains problematic that a low net data rate arises for only few payload data, e.g., 1 to 8 bytes, despite a high data rate in the data segment (gross data rate). As a result, there is a need also for these short payload data or "data packets" to achieve an efficient transmission when using a high-rate data segment. Additionally, the adherence to existing CAN mechanisms for planning the communication matrix and for supporting very short cycle times should be considered.

BRIEF SUMMARY OF THE INVENTION

It is thus the object of the present invention to provide a user station for a bus system and a method, which solve the above-mentioned problems. In particular, a user station for a bus system and a method should be provided which enable a refinement of the CAN signal structures and necessary communication devices toward high data rates and which also render these advantageously and efficiently usable for low payload data from 1 to 8 bytes.

The object is achieved by a user station for a bus system according to the present invention. The user station includes a communication control device for creating or reading at least one message for/from at least one further user station of the bus system, in which exclusive, collision-free access of a user station to a bus of the bus system is ensured at least intermittently, and a data interleaving device for interleaving data packets of at least two messages in one message, so that the data packets are situated in one data segment of the message, and the message has a shared outer frame header for the data packets in front of the data segment and a shared outer frame end for the data packets after the data segment.

Due to the user station, a use of novel communication formats in the middle segment of the CAN frame becomes possible and may also be advantageously and efficiently used for low payload data from 1 to 8 bytes.

During communication, in particular no additional system is operated in parallel for this purpose, but the actual CAN structure is refined in multiple approaches and implementation suggestions for high data rates.

Even when interleaving short data packets for the broadband CAN communication, it is possible to adhere to existing CAN mechanisms for planning the communication matrix and for supporting very short cycle times in the user station. With the aid of high-rate data segments, the user station makes it possible to bundle multiple CAN messages.

Moreover, as a result of the user station the CAN bus system is refined for higher speeds beyond CAN-FD in such a way that essential application features are consistent with existing CAN principles. In this way, a mixed operation is possible, in which the user stations designed for higher speeds are operated in mixed networks with existing CAN user stations or CAN nodes.

The above-described user station is also suited, as needed, for use in systems which are able to process data rates beyond CAN-FD.

According to one exemplary embodiment, the data packets situated in the data segment of the message are created by the user station. According to a further exemplary embodiment, the data packets situated in the data segment of the message are created by the user station and at least one further user station of the bus system.

Optionally, it is conceivable that at least one of the data packets interleaved in the data segment includes a training sequence which includes pieces of information for determining the channel characteristic between the user station and a further user station of the bus system to which the data packet interleaved in the data segment is to be transmitted.

The user station possibly has a correction device for correcting a message received by the user station in the form of a signal based on the training sequence.

The frame header and the frame end may be formed according to the CAN protocol and extensions with respect to the data interleaving.

It is conceivable to configure the data interleaving device in such a way that the frame header additionally includes at least one signaling bit for signaling a data interleaving in the data segment and/or that the frame end includes a checksum of the data in the frame header and/or data segment.

According to one embodiment, the data interleaving device may be designed in such a way that it divides the data packets to be interleaved into groups, each group having a fixed message length, which is transmitted in the customary CAN format and with the at least one signaling bit.

According to one further embodiment, the fixed message length of the groups may be different for the individual groups.

According to still another embodiment, it is possible for each group to have an established cycle time to wait for the emission of another user station having a message of the same group.

According to still another embodiment, it is also possible for the data interleaving device to be designed in such a way that, for the purpose of prioritizing and grouping messages to be interleaved, it divides the messages having the same priority, message length and cycle time into one group of the group.

According to still another embodiment, it is also possible for the group size to be indicated in a control field of the frame header.

The data interleaving device may also be designed in such a way that, in the frame header, the complete CAN identifier of the message is transmitted, which initiates the emission of the message and thus transmits the outer frame header and the outer frame end of the message.

The above-described user station may form part of a bus system which additionally includes a bus line and at least two user stations, which are connected to each other via the bus line in such a way that they are able to communicate with each other. At least one of the at least two user stations is an above-described user station.

The above-mentioned object is furthermore achieved by a method for broadband CAN communication as recited in Patent claim 10. The method includes the following steps: creating or reading, with the aid of a communication control device, at least one message for/from at least one further user station of the bus system, in which exclusive, collision-free access of a user station to a bus of the bus system is ensured at least intermittently, and interleaving, with the aid of a data interleaving device, data packets of at least two messages in one message, so that the data packets are situated in one data segment of the message, and the message has a shared outer frame header for the data packets in front of the data segment and a shared outer frame end for the data packets after the data segment.

The method offers the same advantages as those mentioned above with respect to the user station.

Further possible implementations of the present invention also include not explicitly described combinations of features or specific embodiments which are described at the outset or hereafter with respect to the exemplary embodiments. Those skilled in the art will also add individual aspects as improvements or supplements to the particular basic form of the present invention.

DETAILED DESCRIPTION OF THE INVENTION

In the figures, identical or functionally equivalent elements are denoted by the same reference numerals, unless indicated otherwise.

Figure 1:
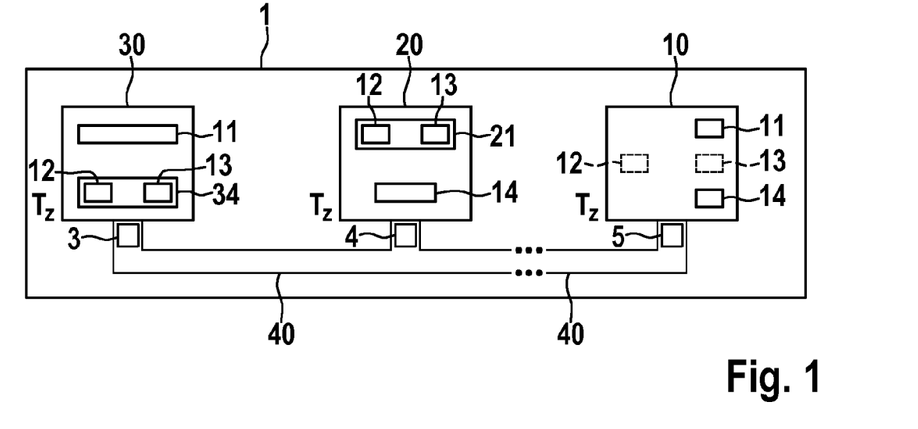
FIG. 1 shows a simplified block diagram of a bus system according to a first exemplary embodiment.

FIG. 1 shows a bus system 1, which may be a CAN bus system, a CAN-FD bus system and the like, for example. Bus system 1 may be used in a vehicle, in particular a motor vehicle, an airplane and the like, or in a hospital and the like.

In FIG. 1, bus system 1 has a plurality of user stations 10, 20, 30, which are each connected to a bus line 40. Messages 3, 4, 5 in the form of signals may be transmitted between individual user stations 10, 20, 30 via bus line 40. User stations 10, 20, 30 may be control units or display devices of a motor vehicle, for example. User stations 10, 20, 30 each have an established cycle time $T_Z$, which is described in greater detail hereafter with reference to FIG. 5 and FIG. 6.

As shown in FIG. 1, user station 10 includes a communication control device 11, optionally a data interleaving device 12, optionally a correction device 13, and a transceiver 14. In contrast, user station 20 has a communication control device 21, which includes a data interleaving device 12 and a correction device 13, and a transceiver 14. User station 30, like user station 10, has a communication control device 11 and a transceiver 34, which includes a data interleaving device 12 and a correction device 13. Transceivers 14, 34 of user stations 10, 20, 30 are directly connected in each case to bus line 40, even though this is not shown in FIG. 1.

As shown in FIG. 1, each of user stations 20, 30 includes a data interleaving device 12 and a correction device 13. Data interleaving device 12 and correction device 13 do not necessarily have to be present in user station 10. Moreover, data interleaving device 12 and correction device 13 are part of communication control device 21 in user station 20. However, in user station 30, data interleaving device 12 and correction device 13 are part of transceiver 34. Communication control device 21 of user station 20 is otherwise identical to communication control device 11 of user station 10. Moreover, transceiver 34 of user station 30 is otherwise identical to transceiver 14 of user station 10.

Communication control device 11 is used to control a communication of the particular user station 10, 20, 30 via bus line 40 with another user station of user stations 10, 20, 30 connected to bus line 40. Data interleaving device 12 and correction device 13 are used to transmit messages 3, 4, 5 at a high data rate on bus line 40 having a CAN bus topology, as is described in greater detail hereafter. Communication control device 11 may be designed as a conventional CAN controller. Transceiver 14 may be designed as a conventional CAN transceiver with respect to its transmission functionality.

The two user stations 20, 30 may be used to form and then transmit messages 3, 4 even at higher data rates than CAN-FD, a good or better net data rate than with a transmission according to the CAN protocol also being achieved for payload data having a length of 1 to 8 bytes. User station 10, in contrast, corresponds to a conventional CAN user station, both with respect to its transmission functionality and its reception functionality, and transmits messages 5 according to the CAN protocol if it does not include data interleaving device 12 and correction device 13.

Figure 2:
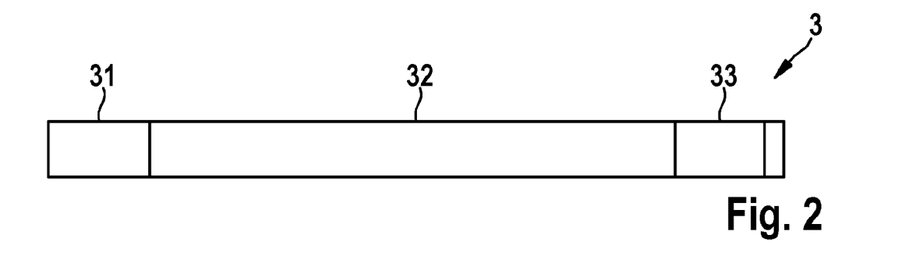
FIG. 2 through FIG. 4 show a schematic representation of the composition of a message which is transmitted in the bus system according to the first exemplary embodiment.

FIG. 2 shows a very schematic representation of the composition of a message 3, which is composed identically to a message 4. Accordingly, message 3, which is also referred to as a frame, has a frame header 31, a data segment 32, and a frame end 33. Frame header 31 is situated at the start of message 3, data segment 32 is situated in the middle, and frame end 33 at the end of message 3. Except for marking or signaling bits which are adapted in particular in terms of their value, frame header 31 corresponds to the CAN header of a CAN frame, i.e., a message 5. Except for marking or signaling bits which are adapted in particular in terms of their value, frame end 33 corresponds to the CAN end of a CAN frame, i.e., a message 5.

In middle data segment 32, data interleaving device 12 may consecutively situate or interleave multiple data packets of different CAN messages, if necessary. No additional protocol or an additional data channel is required for this purpose, but data interleaving device 12 merely adapts the signal format when creating a message 3, 4. The form of the signal format is designed in such a way that it allows secure communication even with typical signal interferences, e.g., due to irradiation and the like, and hardware tolerances impacting synchronization requirements, and at the same time adheres to the spectral masks with respect to radiation or electromagnetic compatibility (EMC).

Figure 3:
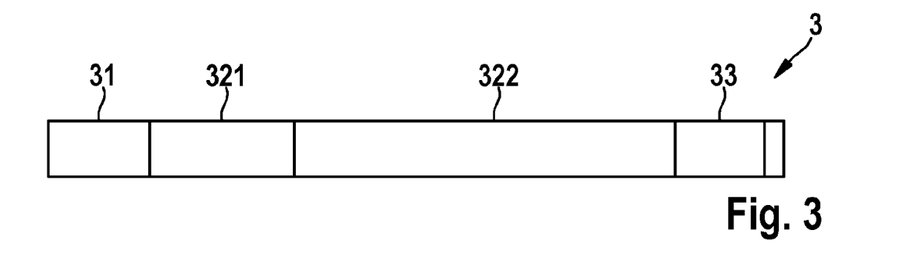

According to FIG. 3, data segment 32 has a training sequence 321 and data 322. In the variant shown in FIG. 3, training sequence 321 is situated in front of data 322, i.e., at the start of data segment 32. Alternatively, however, training sequence 321 may also be situated in the middle, for example, or at the end, and the like, of data segment 32. In most instances, the position does not matter due to buffering. Training sequence 321 allows all user stations 10, 20, 30 to ascertain the particular channel characteristic of bus line 40 based on the instantaneously received data frame. The particular channel characteristic results from the fact that for different CAN bus topologies different propagation paths exist for the signals on bus line 40. Depending on the considered user station 10, 20, 30 as the sender and receivers communicating with it, these connections have different impulse responses, which contribute to signal distortion.

For the extension of the CAN communication toward high data rates, the temporal extent of a standard CAN frame is adhered to and existing CAN structures, such as the header and end of a CAN frame, are maintained in the present exemplary embodiment for compatibility reasons. For each message 3, 4, this results in a maximal temporal length on the one hand and, due to the overhead for frame header 31 and frame end 33, in a minimal temporal length on the other hand.

Figure 4:
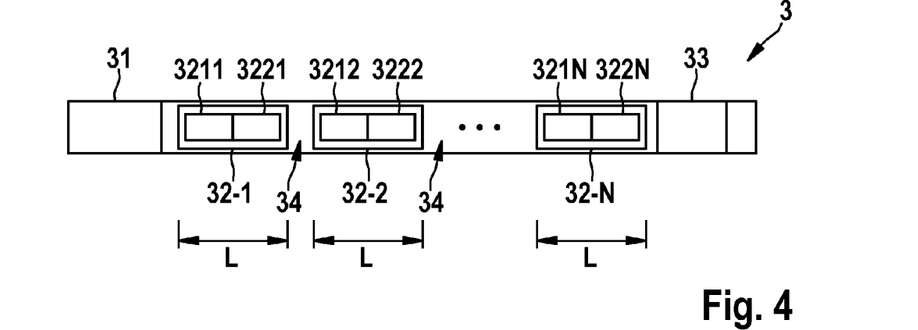

FIG. 4 shows a CAN frame 30 according to the present exemplary embodiment, according to which the interleaving of multiple CAN messages or their data packets 32-1, 32-3 through 32-N in a CAN frame or a message 3 is carried out to increase the (effective) net data rate R also for short CAN messages or data packets 32-1, 32-2 through 32-N. In contrast, no interleaving of data packets is carried out in message 3 of FIG. 3, which is possible due to the mechanisms described hereafter.

As shown in FIG. 4, in the present exemplary embodiment, multiple short CAN messages or their data packets 32-1, 32-2 through 32-N are consecutively situated in data segment 32 at established intervals and lengths L using short guard intervals 34. Optionally, as proposed for high-rate transmission formats, a training sequence 3211, 3212 through 321N may be accommodated in each of data packets 32-1, 32-2 through 32-N, in addition to payload data 3221, 3222 through 322N, as shown in FIG. 4. Training sequences 3211, 3212 through 321N are each helpful since an equalization of the signals in the receiver, for example with the aid of correction device 13, is often necessary due to the use of high-rate transmission formats in data segment 32. To carry out such an equalization with the aid of correction device 13, a piece of channel state information of bus line 40 is required. The piece of channel state information may be calculated from the corresponding reception signal, e.g., when using the corresponding training sequence 3211, 3212 through 321N in data segment 32. FIG. 4 shows the possible arrangement of corresponding training sequence 3211, 3212 through 321N. Optional training sequences 3211, 3212 through 321N and guard interval 34 allow the individual CAN messages or data packets 32-1, 32-2 through 32-N to be received separately.

With this partitioning, CAN frame 30 is designed in such a way that multiple short data packets 32-1 through 32-N may be transmitted in an interleaved manner. In this way, a higher net data rate R may also be achieved for short data packets 32-1 through 32-N than previously.

Net data rate R of a message 3 results for the assumption of gross data rate $R_O$ for the overhead, i.e., in frame header 31 and frame end 33, and gross data rate $R_D$ for data segment 32 and the number of transmission bits $N_O$ in the overhead, i.e., frame header 31 and frame end 33, and the number of transmission bits $N_D$ for data segment from the averaging $$R = N_D / (N_O/R_O + N_D/R_D).$$

For a first gross data rate $R_{D1} \approx 100$ Mbit/s as gross data rate $R_D$, a first example $N_O \approx 70$ bit, $R_O \approx 1$ Mbit, $N_{D1} \approx 8$ bit results in a first net data rate $R_1 = 114$ kbit/s as net data rate R. In contrast, according to a second example, net data rate $R_2 = 103$ kbit/s results as net data rate R for a second gross data rate $R_{D2} = R_O \approx 1$ Mbit/s as gross data rate $R_D$.

It is apparent that only a small increase of approximately 11% is achieved for such a short data segment 32 of 1 byte (=8 bits), even when using a very high gross data rate $R_D$ in data segment 32, also if gross data rate $R_D$ in the first example is higher by a factor of 100 than in the second example.

Contrary to this, a considerable increase in net data rate R results for a larger number of bits in data segment 32. For example, according to a third example where $N_O \approx 70$ bit, $R_O \approx 1$ Mbit/s, $N_{D3} \approx 64$ byte=512 bit, which corresponds to the maximum number of CAN-FD frames, the third net data rate $R_3 \approx 2.59$ Mbit/s already results for a third gross data rate $R_{D3}=4$ Mbit/s. In contrast, the fourth net data rate $R_4=0.48$ Mbit/s results for a fourth example where $N_O \approx 70$ bit, $R_{D4}=R_O \approx 1$ Mbit/s, $N_{D4} \approx 8$ byte=64 bit (standard CAN). As a result, an increase to 5.4 times the net data rate R is achievable for the third example compared to the fourth example.

In the present exemplary embodiment, the individual CAN messages or their data packets 32-1, 32-2 through 32-N of only one of the user stations, for example only of user station 30, are created and transmitted. Certain planning and an adapted access control are necessary, which are introduced hereafter based on FIG. 7 and Tables 2 and 3.

First, the simplest design case is considered, which is also further optimizable for different cases by parameter variations. To prioritize and group CAN messages or data packets 32-1, 32-2 through 32-N, similar messages having the same priority, length L and cycle time $T_Z$ are combined in groups having the same priority.

Figure 7:
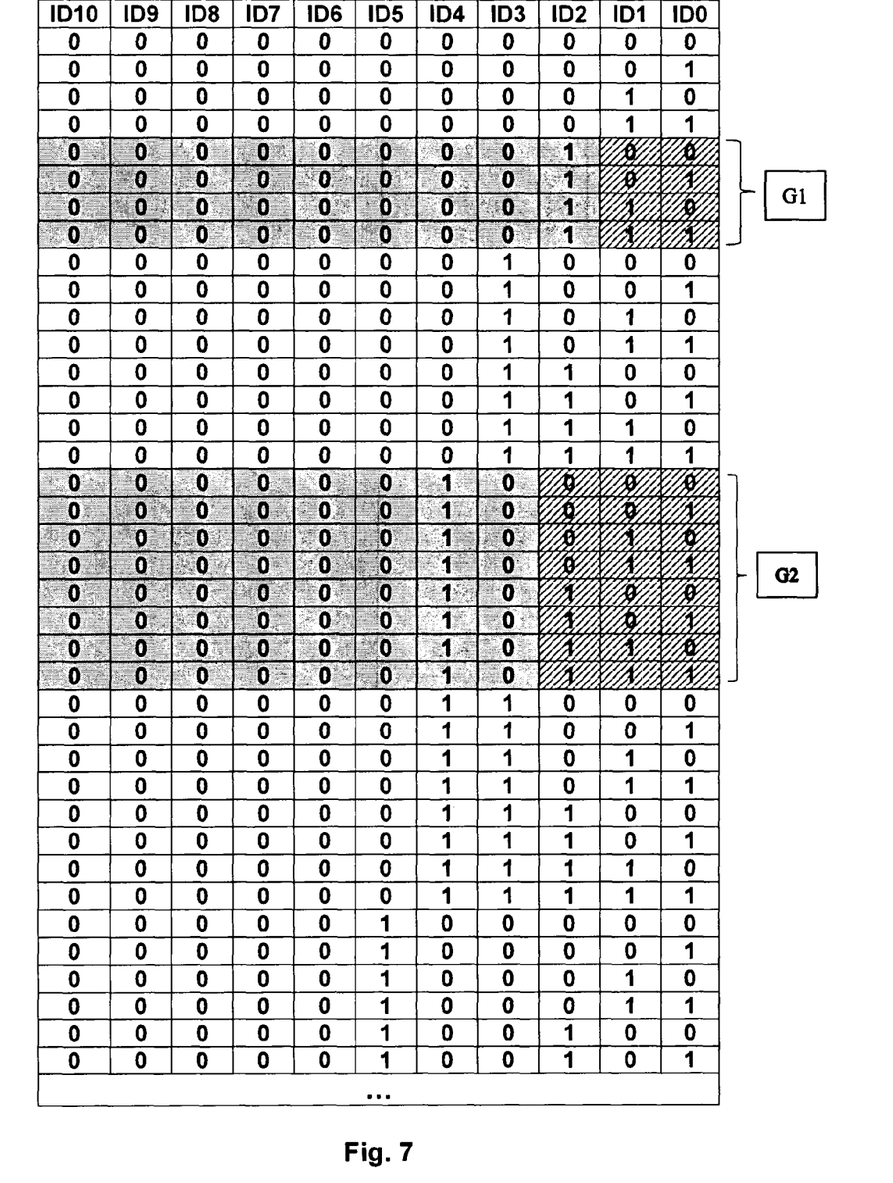
FIG. 7 shows a table for the assignment of CAN addresses.

As shown in FIG. 7, the assignment of CAN addresses or CAN identifiers (CAN IDs) is now carried out in groups G1, G2, . . . GN in which the front $N_{ID1}$ bits of the addresses do not differ, and each element within a group can be clearly identified based on the rear $N_{ID2}$ bits, which are shown in FIG. 7 in the hatched areas.

FIG. 7 shows a group G1 for (up to) $N_G=4$ elements, and a group G2 for (up to) $N_G=8$ elements. The number of elements $N_G$ in a group determines the partitioning corresponding to $N_{ID1}=N_{ID}-N_{ID2}$ and $N_{ID2}=\log_2(N_G)$, $N_{ID}$ representing the number of bits of the identifier (e.g., $N_{ID}=11$ in the base frame format (CAN 2.0A)).

For each group G1, G2, . . . GN, a fixed message length L is agreed on, which is transmitted in the customary CAN format or with the corresponding extension in the message header or frame header 31. Fixed message length L of groups G1, G2, . . . GN may be different for the individual groups. For example, a reserved bit, which was previously preassigned the value 0, is used for signaling the new format. The position of the reserved bit in the message frame of message 3 must be defined, as illustrated in FIG. 5.

Figure 5:
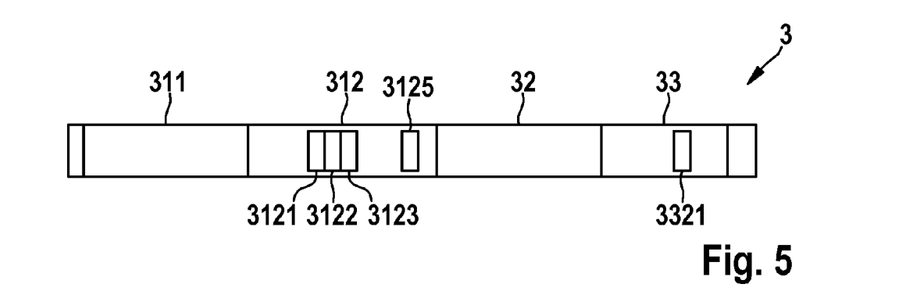
FIG. 5 shows a schematic representation of the composition of a message header of a message which is transmitted in the bus system according to the first exemplary embodiment.

FIG. 5 shows the message header or frame header 31 in greater detail. Accordingly, frame header 31 has an identifier 311 and a control field 312 having three signaling bits 3121, 3122, 3123 and information of packet length 3125 of the individual CAN messages or data packets 32-1, 32-2 through 32-N. Three signaling bits 3121, 3122, 3123 represent an extension compared to the existing CAN format. The arrangement of three signaling bits 3121, 3122, 3123 in FIG. 5 is only one of different possible arrangements in frame header 31. Frame end 33 includes a checksum 3321 of the data in data segment 32, as is already customary in the existing format of a CAN message.

When signaling bit 3121 is activated, which corresponds to the value 1, data segment 32 is divided into 2 parts, and thus for the transmission of 2 packets. Otherwise, i.e., when signaling bit 3121 has the value 0, a transmission is carried out in the existing form. In this way, first signaling bit 3121 indicates whether the frame or message 3 has been divided into at least two parts (signaling bit 3121 has the value 1) or not (signaling bit 3121 has the value 0). For the case that signaling bit 3121 has the value 1, this is hierarchically continued, so that it is indicated with the second bit, signaling bit 3122 whether the frame or message 3 has been divided into at least four parts (signaling bit 3122 has the value 1) or not (signaling bit 3122 has the value 0). If first signaling bit 3121 has the value 1 and second signaling bit 3122 has the value 0, the frame or message 3 is then divided only into two parts. In this case, third signaling bit 3123 then has no further influence on the division. However, if both first signaling bit 3121 and second signaling bit 3122 have the value 1, it is indicated with third bit to signaling bit 3123 whether the frame has been divided into eight parts (signaling bit 3123 has the value 1) or is composed of only four parts (signaling bit 3123 has the value 0).

With the selected bit combination, the establishment of the grouping used (number of elements $N_G$) is also implicitly transmitted, which usually represents a power of 2. Since each element of a group G1, G2, . . . GN should be assigned a position in the packet partitioning for collision-free transmission, a partitioning into an appropriate number is selected, as is illustrated in the following Table 2.

TABLE 2

| Values of the sequence of the signaling bits 3121, 3122, 3123 | Group elements $N_G$ | Packets in the data part |
| --- | --- | --- |
| 0xx | 1 (no grouping) | 1 (standard format if necessary) |
| 10x | 2 | 2 |
| 110 | 4 | 4 |
| 111 | 8 | 8 |

In Table 2, 'x' instead of '0' or '1' denotes an arbitrarily selectable bit state.

Alternatively, each bit combination made up of second and third signaling bits 3122, 3123 may be assigned a division which becomes active when first signaling bit 3121 has the value 1. In this way, four possible partitionings are then available. It is thus possible, e.g., to implement a partitioning into up to 16 possible group elements, as illustrated in the following Table 3.

TABLE 3

| Values of the sequence of the signaling bits 3121, 3122, 3123 | Group elements $N_G$ | Packets in the data part |
| --- | --- | --- |
| 0xx | 1 (no grouping) | 1 (standard format if necessary) |
| 10x | 2 | 2 |
| 101 | 4 | 4 |
| 110 | 8 | 8 |
| 111 | 16 | 16 |

In Table 3 as well, 'x' instead of '0' or '1' denotes an arbitrarily selectable bit state.

The assignment of individual elements of a group G1, G2, . . . GN to a position of the corresponding data packet 32-1, 32-2, . . . 32-N in data segment 32 is carried out via identifier 311. The last log 2(NG) bits of identifier 311 [ID<log 2(NG)−1> . . . ID0] are interpreted as a decimal number of the set {0 . . . (NG−1)}, and a direct assignment to the possible packet positions {1 . . . NG} is carried out, which are illustrated in FIG. 5.

Each group has an established cycle time $T_Z$ during which a communication takes place. For example, user station 30 waits for the established cycle time $T_Z$ to elapse to wait for the emission of a data packet (32-1, 32-2 through 32-N of the same group (G1, G2, . . . GN).

Securing of the transmission is achieved with the aid of a cyclic redundancy check (CRC), which is captured in the checksum 3321, or also via an additional channel coding.

Errors and error handling (error signaling) may be indicated either via superimposed signals during the particular packet emission or via separate time slots.

By interleaving the short data packets 32-1, 32-2, . . . 32-N in data segment 32, the increase in net data rate R may also be achieved for short messages 32-1, 32-2, . . . 32-N, as described above.

According to one modification of the present exemplary embodiment, only one of training sequences 3211, 3212, . . . 321N, for example training sequence 3211, is transmitted for all data packets 32-1, 32-2 through 32-N together in data segment 32. This is sufficient in the present exemplary embodiment since data packets 32-1, 32-2 through 32-N are created and transmitted by only one of the user stations, for example only by user station 30. By eliminating the other training sequences 3212, . . . 321N, the net data rate may thus be even further increased.

Figure 6:
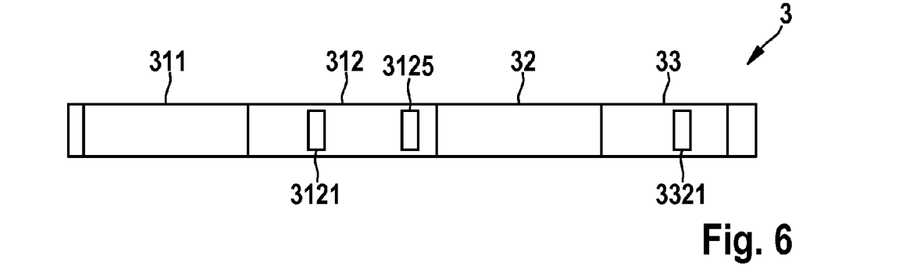
FIG. 6 shows a schematic representation of the composition of a message header of a message which is transmitted in the bus system according to a second exemplary embodiment.

FIG. 6 shows a message 6 according to a second exemplary embodiment, which differs from message 3 according to the preceding exemplary embodiment with respect to the number of signaling bits. This is the case because message 3 according to a second exemplary embodiment in FIG. 6 has only signaling bit 3121 in control field 312.

In this way, data interleaving device 12 may arrange only two different messages or their data packets 32-1, 32-2 of message 3 into data segment 32. Otherwise, the bus system according to the present exemplary embodiment is designed identically to bus system 1 according to the preceding exemplary embodiment.

According to a third exemplary embodiment, it is possible to transmit messages or their data packets 32-1, 32-2 through 32-N from at least two different user stations 10, 20, 30 in at least one of messages 3, 4. In this case as well, optional training sequences 3211, 3212 through 321N and guard interval 34 allow the individual messages or data packets 32-1, 32-2 through 32-N according to FIG. 4 to be received separately. However, in this case, each data packet 32-1, 32-2 through 32-N may also include a packet header in front of optional training sequence 3211, the packet header being configured according to the CAN protocol. This is helpful in particular if no training sequences 3211, 3212 through 321N are transmitted in order to transmit additional information to the receiver about the sender of the particular data packet 32-1, 32-2 through 32-N.

In this case of an interleaved transmission of multiple short CAN messages or data packets 32-1, 32-2 through 32-N as well, certain planning and an adapted access control are necessary, which are introduced hereafter.

In the present exemplary embodiment, prioritizing and grouping of the CAN messages or their data packets 32-1, 32-2 through 32-N are also carried out as previously described with respect to the first exemplary embodiment in conjunction with Tables 1 through 3.

In the present exemplary embodiment, it is additionally important for the transmission that all user stations 10, 20, 30 preferably have no coordination complexity and, corresponding to the CAN principles, safety from collisions implicitly results. The following method is introduced for this purpose.

Each group has an established cycle time $T_Z$ during which a communication takes place. For example, if user station 30 wants to transmit a data packet 32-1 as part of a (group) packet, user station 30 waits after a send request for time $T_Z$ to elapse to wait for the emission of another user station, for example of user station 20, having a data packet 32-2 of the same group. If user station 30 detects the emission of another user, i.e., user station 20, for example, user station 30 transmits its packet 32-1 in the same frame at the intended position. If within time $T_Z$ no corresponding emission of another user of bus system 1 (FIG. 1) is detected, the emission of the corresponding data packet 32-1, including frame header 31 (FIG. 4 and FIG. 5), is carried out. The complete CAN identifier 311 of message 3 is always transmitted in frame header 31, which initiates the emission of message 3, i.e., transmits the outer CAN frame including frame header 31 and frame end 33. In this way, collision-free media access is ensured.

All messages 32-1, 32-2 through 32-N of a group G1, G2, . . . GN have the same prefix of CAN identifier 311 ($[ID<N_{ID}-1> . . . ID<\log_2(N_G)>]$). Moreover, the group size in each control field 312 (FIG. 5) is communicated in packet length 3125. For these reasons, not only are collisions precluded, but the priorities of data packets 32-1, 32-2 through 32-N on bus line 40 are also hierarchically established.

The emission of data packets 32-1, 32-2 through 32-N at the intended packet positions is carried out independently by user stations 10, 20, 30, so that degrees of freedom exist for the physical layer to securely transmit data packets 32-1, 32-2, through 32-N from various user stations 10, 20, 30. For this purpose, e.g., a synchronization of the user station of user stations 10, 20, 30 acting as the transmitter and of the user station acting as the receiver should be made possible for each individual packet of a divided message 3, 4 since arbitrary combinations of transmitting and receiving points are possible and the propagation times may vary by up to ~1 microsecond. An optional guard interval 34 (FIG. 5) between data packets 32-1, 32-2 through 32-N protects from propagation time-related overlaps, and optional training sequence 3211 through 321N (FIG. 5) may be used for channel estimation and synchronization. Optionally, each user 10, 20, 30 acting as a transmitting node may synchronize with the initial node or the initial user station which initiates the emission of a packet of data packets 32-1, 32-2 through 32-N, and thus transmits the CAN frame or message 3. An additional shared training sequence may be provided for this purpose, if necessary.

Once again, the transmission is secured with the aid of a cyclic redundancy check (CRC), which is captured in checksum 3321, or also via an additional channel coding.

Moreover, once again error and error handling (error signaling) may be carried out either via superimposed signals during the particular packet emission or via separate time slots.

All above-described embodiments of bus system 1, user stations 10, 20, 30 and of the method may be used individually or in any possible combinations. In particular, all features of the above-described exemplary embodiments may be arbitrarily combined. In addition, in particular the following modifications are conceivable.

The above-described bus system 1 according to the exemplary embodiments is described based on a bus system which is based on the CAN protocol. Bus system 1 according to the exemplary embodiments, however, may also be a different type of communication network. It is advantageous, but not a necessary prerequisite, to ensure an exclusive, collision-free access of a user station 10, 20, 30 to a shared channel in bus system 1, 2, at least for certain time periods.

A partitioning in control field 312 deviating from the described partitioning is possible to indicate the interleaved transmission operating modes. It is also possible to define used and reserved bits.

In addition to the design of the exemplary embodiments for non-synchronous systems, variants for time-triggered (TT) systems, e.g., TTCAN, and the like, are also conceivable, which are possible without additional fields in control field 312.

Bus system 1, 2 according to the exemplary embodiments is in particular a CAN network or a TTCAN network or a CAN-FD network.

The specific embodiment of grouped messages or packets 32-1, 32-2 through 32-N may also be extended to packets having different lengths within a group G1, G2, . . . GN.

A group G1, G2, . . . GN may also be defined with packets 32-1, 32-2 through 32-N of different communication cycles or cycle time $T_Z$, so that the emissions are then primarily initiated by messages 3 or packets 32-1, 32-2 through 32-N having a short cycle time $T_Z$.

Priority classes may be used within interleaved packets 32-1, 32-2 through 32-N to avoid having to have a dedicated position available for each message or packet 32-1, 32-2 through 32-N, but to assign multiple packets to the same position in a message 3. For this purpose, an additional arbitration for the individual packet positions becomes necessary, which may be carried out in accordance with the CAN arbitration principle, for example. For the implementation, a corresponding sequence, which is composed of a portion of the last log 2(NG) bits of identifier 311 [ID<log 2(NG)−1> . . . ID0], is provided in the preamble situated in a packet header in front of training sequence 3211.

As was already mentioned, packets 32-1, 32-2 through 32-N may be created and transmitted in an interleaved data frame or a message 3 with and without training sequence 3211, 3212 through 321N.

Packets 32-1, 32-2 through 32-N may be created and transmitted in an interleaved data frame or a message 3 with and without guard interval 34 between packets 32-1, 32-2 through 32-N.

The method which may be carried out by user stations 10, 20, 30 may be implemented for different systems, such as CAN, CAN-FD, and the like, and also for high-rate modulation, if necessary based on the new physical layer with a corresponding design of the packet structure.

Depending on the group formation, it is possible to support different (also dynamic) partitionings of messages 3, 4.

A necessary clock synchronization in user station 10, 20, 30 acting as the receiver may be favored by the design of the packet structures, and may also be supported by additional synchronization packets between data packets 32-1, 32-2 through 32-N.

In addition to a pulse amplitude modulation (PAM), orthogonal frequency division multiplexing (OFDM) may be used as a possible design of the physical layer of future data frames. For this purpose, the data to be transmitted are mapped on symbols of multiple carriers and assigned to the individual frequencies of an OFDM symbol. To separate different users, an arrangement across different frequency groups (adjoining frequencies) may be carried out, instead of the chronological arrangement of all packets or messages 32-1, 32-2 through 32-N, in particular consecutively.

The transmission mode using interleaved packets 32-1, 32-2 through 32-N as an additional operating variant of user stations 10, 20, 30 is preferably implemented in such a form that the corresponding communication device is able to handle all existing CAN modes, among other things CAN-FD, partial networking, and the like. In this way, user stations 10, 20, 30 are also usable in the same system as user stations which do not have the above-described function of data interleaving.

In user stations 10, 20, 30, the transmission mode using interleaved packets 32-1, 32,-2 through 32-N is implemented in such a way that this mode may be operated in coexistence with existing CAN modes (among other things, CAN-FD, partial networking, and the like).

The number and arrangement of user stations 10, 20, 30 in bus system 1 of the exemplary embodiments are arbitrary. In particular, it is also possible that only user stations 10 or user stations 20 or user stations 30 are present in bus system 1 of the exemplary embodiments. User stations 10, 20, 30 also need not include a data interleaving device 12 or a correction device 13. User stations 10, 20, 30 may also include only one data interleaving device 12 or one correction device 13.

In the case of a channel having little distortion, resulting from the line properties, it is possible to use an incoherent transmission which, however, has a considerably worse performance efficiency, instead of a coherent transmission, which necessitates a frequency and phase synchronization and a channel estimation.

The partitioning of the above-described functionality of data interleaving device 12 and of correction device 13 in one communication device 11 may also be implemented in such a way that the above-described functionality is distributed among multiple components. In this way, a preferably similar implementation corresponding to existing CAN controllers and CAN transceivers may be sought. Both analog and digital interfaces may be used for connecting multiple components.

User stations 20, 30 represent an option, in particular for CAN-FD and systems having higher data rates, for increasing the reception quality of CAN-FD and of these systems into the range of customary CAN transmissions using a considerably higher data rate.

The method carried out in user stations 20, 30 may be implemented, for example, in a transceiver 14, 34, in a communication control device 21, and the like. In addition or as an alternative, it may be integrated into existing products, as is illustrated with user station 10.

What is claimed is:

1. A user station for a bus system, comprising:
    a communication control device for one of (i) creating at least one message for at least one further user station of the bus system, or (ii) reading at least one message from at least one further user station of the bus system, wherein exclusive, collision-free access of the user station to the bus of the bus system is ensured at least intermittently; and
    a data interleaving device for interleaving selected data packets of at least two separate messages into one composite message, so that the selected data packets are situated in one selected data segment of the composite message, and the composite message has a shared outer frame header for the selected data packets in front of the selected data segment and a shared outer frame end for the selected data packets after the selected data segment, wherein at least one of the selected data packets interleaved in the selected data segment includes a training sequence containing information for determining a channel characteristic between the user station and the at least one further user station of the bus system to which the selected data packets in the selected data segment is to be transmitted; and
    a correction device for correcting a message received from the at least one further user station in the form of a signal based on the training sequence.

2. The user station as recited in claim 1, wherein at least a portion of the selected data packets situated in the selected data segment of the composite message are created by the user station.

3. The user station as recited in claim 1, wherein the frame header and the frame end are formed according to the CAN protocol with respect to the data interleaving.

4. The user station as recited in claim 1, wherein the data interleaving device forms the composite message in such a way that at least one of (i) the frame header additionally includes at least one signaling bit for signaling a data interleaving in the selected data segment, and (ii) the frame end includes a checksum of the data in the selected data segment.

5. The user station as recited in claim 1, wherein the data interleaving device forms the composite message in such a way that the selected data packets to be interleaved are divided into groups, wherein at least one of:
  (i) each group has a fixed message length and is transmitted in the CAN format and with the at least one signaling bit;
  (ii) the fixed message length of each group is different;
  (iii) each group has an established cycle time to wait for output of the at least one other user station having a message of the same group;
  (iv) each group includes messages having the same priority, same message length and same cycle time; and
  (v) the respective group size is indicated in a control field of the frame header.

6. The user station as recited in claim 1, wherein the data interleaving device forms the composite message in such a way that, in the frame header, the complete CAN identifier of the composite message is transmitted, which initiates the transmission of the composite message and thus transmits the outer frame header and the outer frame end of the composite message.

7. A bus system, comprising:
  a bus line; and
  at least two user stations connected to each other via the bus line and configured to communicate with each other;
  wherein at least one of the user stations includes:
    a communication control device for one of (i) creating at least one message for at least one further user station of the bus system, or (ii) reading at least one message from at least one further user station of the bus system, wherein exclusive, collision-free access of the user station to the bus of the bus system is ensured at least intermittently; and
    a data interleaving device for interleaving selected data packets of at least two separate messages into one composite message, so that the selected data packets are situated in one selected data segment of the composite message, and the composite message has a shared outer frame header for the selected data packets in front of the selected data segment and a shared outer frame end for the selected data packets after the selected data segment wherein at least one of the selected data packets interleaved in the selected data segment includes a training sequence containing information for determining a channel characteristic between the user station and the at least one further user station of the bus system to which the selected data packets in the selected data segment is to be transmitted; and
    a correction device for correcting a message received from the at least one further user station in the form of a signal based on the training sequence.

8. A method for broadband CAN communication, comprising:
  one of (i) creating, with a communication control device, at least one message for at least one further user station of the bus system, or (ii) reading, with a communication control device, at least one message from at least one further user station of the bus system, wherein exclusive, collision-free access of the user station to the bus of the bus system is ensured at least intermittently; and
  interleaving, with a data interleaving device, selected data packets of at least two separate messages into one composite message, so that the selected data packets are situated in one selected data segment of the composite message, and the composite message has a shared outer frame header for the selected data packets in front of the selected data segment and a shared outer frame end for the selected data packets after the selected data segment, wherein at least one of the selected data packets interleaved in the selected data segment includes a training sequence containing information for determining a channel characteristic between the user station and the at least one further user station of the bus system to which the selected data packets in the selected data segment is to be transmitted; and
  correcting, via a correcting device, a message received from the at least one further user station in the form of a signal based on the training sequence.

* * * * *